H. K. HORTON.
Grain-Drill.
No. 44,801. Patented Oct. 25, 1864.
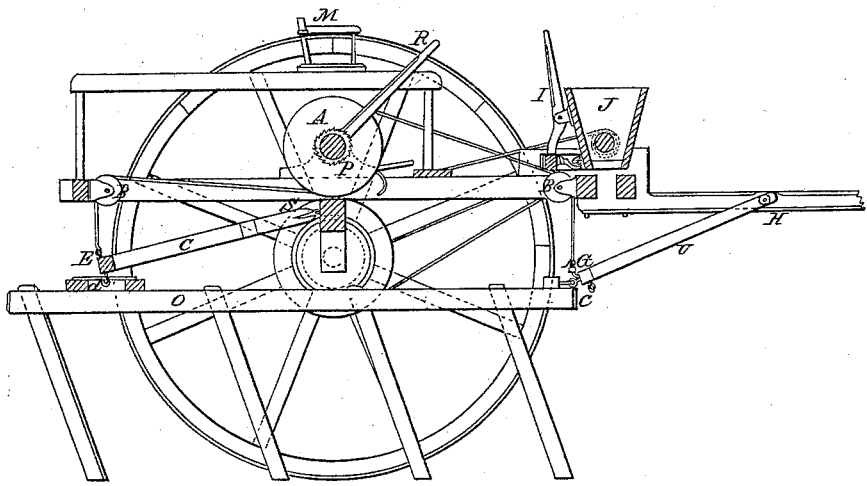
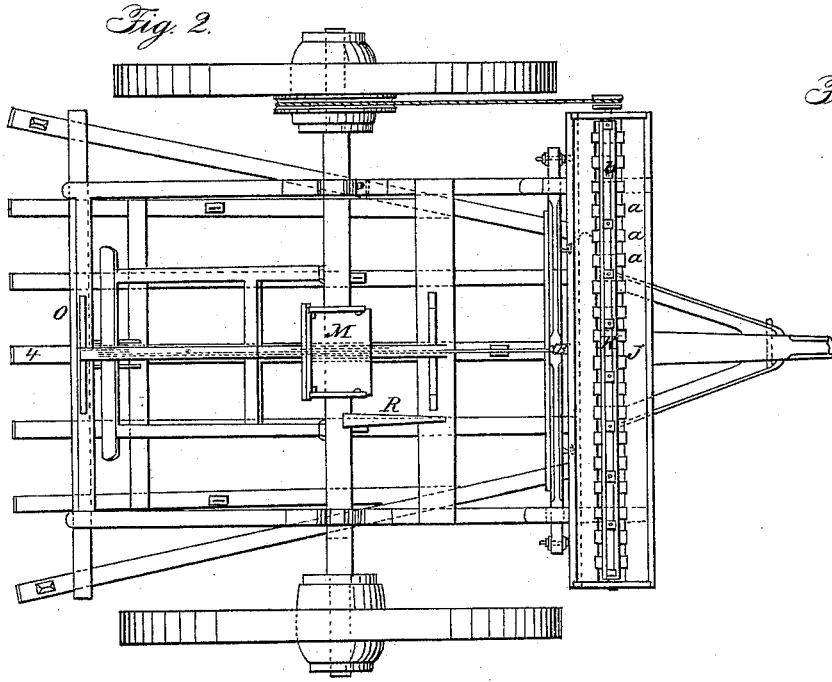 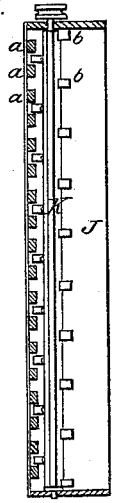
Witnesses:
L. L. Coburn
W. E. Maus
Inventor:
Henry K. Horton

UNITED STATES PATENT OFFICE.

HENRY K. HORTON, OF CAMPTON, ILLINOIS.

SEEDING-MACHINE.

Specification forming part of Letters Patent No. 44,801, dated October 25, 1864.

*To all whom it may concern:*

Be it known that I, HENRY K. HORTON, of Campton, in the county of Kane and State of Illinois, have invented a new and useful Improvement in Seed-Sowers; and I do hereby declare that the following is a full, clear, and exact description of the same, reference being had to the accompanying drawings and letters of reference marked thereon, which form a part of this specification, and in which—

Figure 1 represents a side elevation of my improved seed-sower with one wheel removed; Fig. 2, a top view of the same; Fig. 3, a sectional view of the seed-box, showing the shaft which revolves therein.

To enable those skilled in the art to manufacture and use my invention, I will proceed to describe it with particularity.

The seed-box J is manufactured in the usual form, but has extending across the bottom of it wooden strips *a*, (indicated in Fig. 2,) which are about an inch thick, and are placed about one inch apart. The roller or shaft *k* extends through the seed-box just above said strips of wood, and there are fastened to its surface at intervals, spirally around it, sheet-iron flanges *b*, which, when the shaft revolves, turn in the spaces between the strips of wood. These flanges are constructed so as to nearly fill the spaces between the strips as they revolve in them. The shaft K is made to revolve by means of a belt running on the end of K and on the wheel of the seed-sower, as shown in Fig. 2. The slide-board Q is so arranged that it may be slid back and forth by means of the lever I in such a manner as to regulate the discharge of the seed from the seed-box or to close the bottom of the seed-box altogether.

O is a frame, to which are attached the cultivator-plows for the purpose of covering the grain after it is sown from the box J; and it is attached to the main frame of the seed-sower by the frame U, which is hinged to the tongue of the machine at H, and the frame C, which is hinged to the axle of the machine at S. There is also a joint, *c*, where the frame U is attached to the frame O, and the frame O is attached to the piece C by means of the rod *d*, which is attached to the frame O, as shown, passing through the loop *e*, which is made fast to the end of C, the rod sliding in said loop as the frame O rises and falls. By this attachment the cultivator-plows are not raised from the ground by the wheels of the seed-sower passing over an uneven surface, and the frame O, as it passes over uneven ground, rises and lowers independent of the rest of the machine.

To the double-grooved wheel A there are two chains attached, which extend over the pulleys B B to the frame O, one being attached at the front end of said frame at G and the other at the rear end at E.

The operator by pulling the lever R winds up the chains on the wheel A and raises the device for covering the grain from the ground; and by means of the ratchet-wheel and pawl P he is able to elevate the frame O, so as to cover the grain at any required depth, or raise it entirely from the ground to drive to and from the field, the pawl holding the frame O suspended on the said chains at the desired elevation. To let the frame down again the operator, sitting on the seat M, simply places his foot on the pawl P, raising it from the ratchet-wheel.

The object of the flanges on the shaft K is to stir the grain as it falls into the recesses between the strips of wood across the bottom of the seed-box and prevent it from clogging; and by the use of the slide-board Q the quantity of seed sown is completely regulated.

This construction is very simple, and cheaper than any other seeder in use. I consider the device for covering the grain at any desired depth to be of great importance, as it is well known to all farmers that it is very essential to cover different kinds of grain at different depths and the same kinds of grain at different depths in different kinds of soil.

Another great advantage in my seeder is the facility with which it can be changed into a cultivator. By simply removing the band from the shaft K and the middle beam (marked 4) from the frame O my machine can be used for a cultivator.

Having thus fully described the construction and operation of my seed-sower, what I claim as my invention, and desire to secure by Letters Patent, is—

The combination and arrangement of the seed-coverer O and the hinged frames U and C, when constructed and operating substantially as herein specified.

HENRY K. HORTON.

Witnesses:
G. E. GILLMAN,
M. V. B. SMITH.